(12) United States Patent
Kelley et al.

(10) Patent No.: US 7,276,304 B2
(45) Date of Patent: Oct. 2, 2007

(54) FUEL CELL SYSTEM INCLUDING A UNIT FOR ELECTRICAL ISOLATION OF A FUEL CELL STACK FROM A MANIFOLD ASSEMBLY AND METHOD THEREFOR

(75) Inventors: Dana A. Kelley, New Milford, CT (US); Mohammad Farooque, Danbury, CT (US); Keith Davis, Southbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 240 days.

(21) Appl. No.: 11/020,593

(22) Filed: Dec. 23, 2004

(65) Prior Publication Data

US 2006/0141306 A1 Jun. 29, 2006

(51) Int. Cl.
*H01M 8/00* (2006.01)
*H01M 2/08* (2006.01)
*H01M 2/14* (2006.01)

(52) U.S. Cl. .................. 429/13; 429/35; 429/38
(58) Field of Classification Search .......... 429/12, 429/13, 35, 38
See application file for complete search history.

(56) References Cited

U.S. PATENT DOCUMENTS

| | | | | |
|---|---|---|---|---|
| 4,414,294 | A | * | 11/1983 | Guthrie ............... 429/35 |
| 4,467,018 | A | | 8/1984 | Schroll .............. 429/18 |
| 5,607,786 | A | * | 3/1997 | Guthrie et al. ........ 429/34 |
| 6,410,161 | B1 | | 6/2002 | Li ................... 428/621 |
| 6,413,665 | B1 | | 7/2002 | Blanchet et al. ....... 429/37 |
| 2005/0058872 | A1 | | 3/2005 | Blanchet et al. |

FOREIGN PATENT DOCUMENTS

JP 6-275303 * 9/1994

* cited by examiner

*Primary Examiner*—Patrick Joseph Ryan
*Assistant Examiner*—Thomas H. Parsons
(74) *Attorney, Agent, or Firm*—Cowan, Liebowitz & Latman, P.C.

(57) ABSTRACT

A fuel cell system with improved electrical isolation having a fuel cell stack with a positive potential end and a negative potential, a manifold for use in coupling gases to and from a face of the fuel cell stack, an electrical isolating assembly for electrically isolating the manifold from the stack, and a unit for adjusting an electrical potential of the manifold such as to impede the flow of electrolyte from the stack across the isolating assembly.

36 Claims, 3 Drawing Sheets

FUEL CELL SYSTEM INCLUDING A UNIT FOR ELECTRICAL ISOLATION OF A FUEL CELL STACK FROM A MANIFOLD ASSEMBLY AND METHOD THEREFOR

STATEMENT AS TO RIGHTS TO INVENTIONS MADE UNDER FEDERALLY SPONSORED RESEARCH AND DEVELOPMENT.

This invention was made with Government support under contract DE-FC21-95MC31184 awarded by the Department of Energy. The Government has certain rights in the invention.

BACKGROUND OF THE INVENTION

This invention relates to fuel cells and, in particular, to an externally manifolded fuel cell system adapted to impede the flow of electrolyte from the fuel cell stack of the system to the manifold used with the stack.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Fuel cells operate by passing a reactant fuel gas through the anode, while passing oxidizing gas through the cathode. In order to produce a useful power level, a number of individual fuel cells are stacked in series with an electrically conductive separator plate between each cell.

A fuel cell stack may be an internally manifolded stack or an externally manifolded stack. An internally manifolded stack typically includes gas passages for delivery of fuel and oxidant gases built into the fuel cell plates. In an externally manifolded stack fuel cell plates are left open on their ends and gas is delivered to the cells by way of manifolds sealed to the respective faces of the fuel cell stack. The manifolds in each type of fuel cell stack provide sealed passages for delivery of fuel and oxidant gases to the fuel cells and prevent those gases from leaking to the environment and to the other manifolds. These functions of the manifolds must be performed under the operating conditions of the fuel cell stack and for the duration of the stack life.

The fuel cell stack is electrically conductive and has an electrical potential gradient along its length such that one end of the stack is at a positive-most electrical potential (the positive potential end of the stack) and the other end is at a negative-most electrical potential (the negative potential end of the stack). External manifolds, which are typically made from metallic materials, must therefore be electrically isolated from the fuel cell stack so as not to short circuit the stack. Electrical isolating assemblies, which include dielectric insulators and one or more gaskets, have been used between the metallic manifold and the fuel cell stack to produce the desired electrical isolation. A typical external manifold system includes three to four manifolds each employing similar electrical isolation assemblies to provide similar seals and dielectric isolation for each of the manifolds.

A schematic exploded view of one manifold and an electrical isolating assembly in a typical arrangement for a conventional externally manifolded fuel cell system 100 is shown in FIG. 1. As shown, the system 100 includes a fuel cell stack 1, a manifold comprising a metallic manifold 6 which covers a face 1a of the stack 1 and an electrical isolating assembly 101 disposed between the stack 1 and the manifold 6. The assembly 101 includes a dielectric member 5, a wet gasket 2 abutting the stack face 1a, a ceramic block or member 3 abutting the wet gasket 2 and a dry gasket 4 disposed between the ceramic block 3 and the dielectric member 5 in an abutting relationship. The other manifolds of the fuel cell system use a similar design.

In liquid electrolyte fuel cell systems, such as for example molten carbonate fuel cells, electrical isolation provided by the electrical isolating assembly 101 may be severely compromised when liquid electrolyte in the fuel cells migrates from the stack to a point where it wets the components of the isolating assembly abutting the manifold 6. In particular, during fuel cell operation, the stack face 1a becomes wet with liquid electrolyte, which is absorbed by the wet gasket 2. The ceramic block 3 comes into contact with liquid electrolyte through its surface abutting the surface of the wet gasket 2. When the electrolyte is transported across the ceramic gasket to reach the dry gasket 4, the dielectric capacity of the ceramic block 3 is substantially reduced. As a result, electrical isolation between the manifold 6 and the stack 1 becomes difficult to maintain with the dry gasket being responsible for most of the voltage drop between the stack 1 and the manifold 6. This voltage drop may be as high as 500 Volts.

The electrolyte migration from the stack face 1a across the electrical isolating assembly 101 is facilitated by the difference in electrical potential between the fuel cell stack and the manifold. Generally, the manifold has a constant electrical potential floating between the positive-most and the negative-most electrical potentials of the stack. This causes the manifold to be at a lower potential than the positive potential end of the stack. As a result, a positive electrical potential is applied between the stack and the manifold. This, in turn, promotes the flow of electrolyte from the stack into and through the electrical isolating assembly 101.

More particularly, the electrical potential at the positive potential end of the stack 1 leads to formation of carbonate ions ($CO_3^=$) as follows:

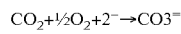

$$CO_2 + \tfrac{1}{2}O_2 + 2^- \rightarrow CO_3^=$$

These carbonate ions are attracted to the lower electrical potential at the manifold 6, this lower electrical potential being shown as a negative electrical potential relative to the stack positive potential. An "electrochemical pump" is thereby created which facilitates the flow of the electrolyte from the positive potential end of the stack across the electrical isolating assembly 101 towards the manifold 6. This results in wetting of the block 3, the gasket 4 and the dielectric insulator 5 with electrolyte so as to compromise their dielectric properties and degrade the electrical isolation ability of the assembly 101.

Conventional electrical isolating assemblies have been adapted to counteract this electrolyte flow by utilizing, for example, a smooth ceramic block for the block 3, as is disclosed in U.S. Pat. No. 6,413,665. Such a construction has prolonged the ability of electrical isolation assemblies to maintain their electrical isolation characteristics by delaying the wetting of the isolating assembly components adjacent the manifold. However, over time, electrolyte migration can still occur. Accordingly, additional ways of impeding the migration of electrolyte from the stack through such electrical isolating assemblies are still being sought.

It is therefore an object of the present invention to provide a fuel cell system adapted to further reduce the migration of electrolyte through an electrical isolating assembly proving electrical isolation between a fuel cell stack and the manifold used with the stack.

It is a further object of the present invention to provide a system of the aforementioned type in which reduction of electrolyte migration is accomplished in a simple and cost effective manner.

SUMMARY OF THE INVENTION

In accordance with the principles of the present invention, the above and other objectives are realized in a fuel cell system comprising a fuel cell stack having a positive potential end and a negative potential, a manifold for use in coupling gases to and from a face of the fuel cell stack, an electrical isolating assembly for electrically isolating the manifold from the stack, and a unit for adjusting an electrical potential of the manifold such as to impede the flow of electrolyte from the stack across the isolating assembly. More particularly, the unit is adapted to adjust the electrical potential of the manifold so that it at least approaches the electrical potential of the positive potential end of the stack and, preferably, becomes equal to or greater than this potential.

In the embodiments of the invention to be disclosed herein below, the unit takes the form, in one case, of a power supply such as, for example, a battery, and in another case, of an electrical wire.

A method for retarding electrolyte migration from a fuel cell stack through an electrical isolating assembly is also disclosed.

In a further aspect of the invention, a dielectric member of an electrical isolating assembly is adapted to prevent debris build up from compromising the electrical isolation provided between a fuel cell stack and its manifold.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
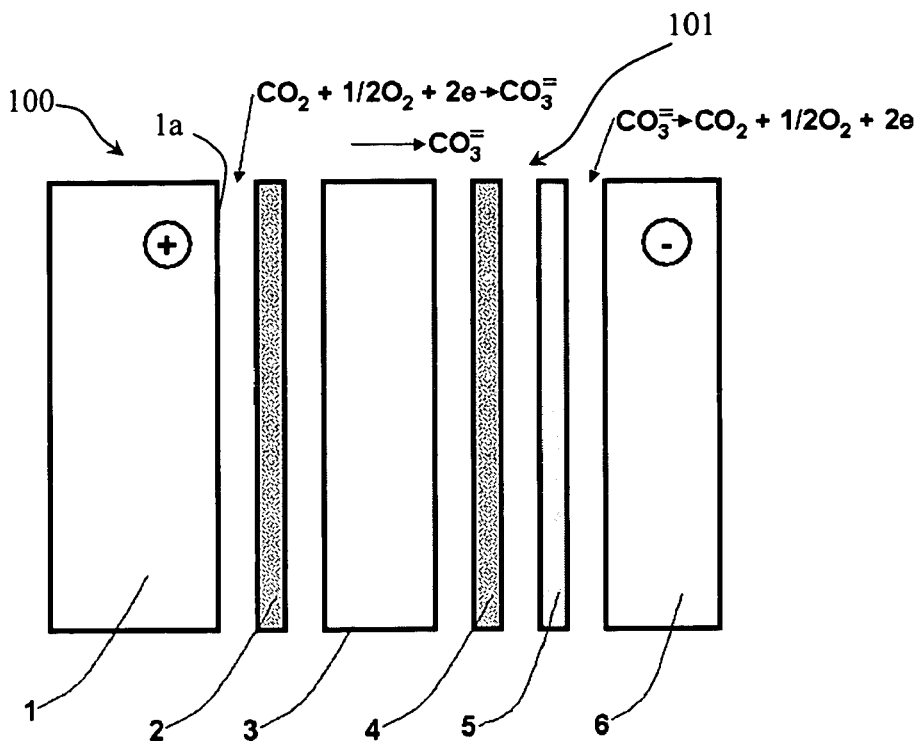
FIG. 1 shows a schematic exploded view of a typical arrangement of a conventional externally manifolded fuel cell system.
Figure 2:
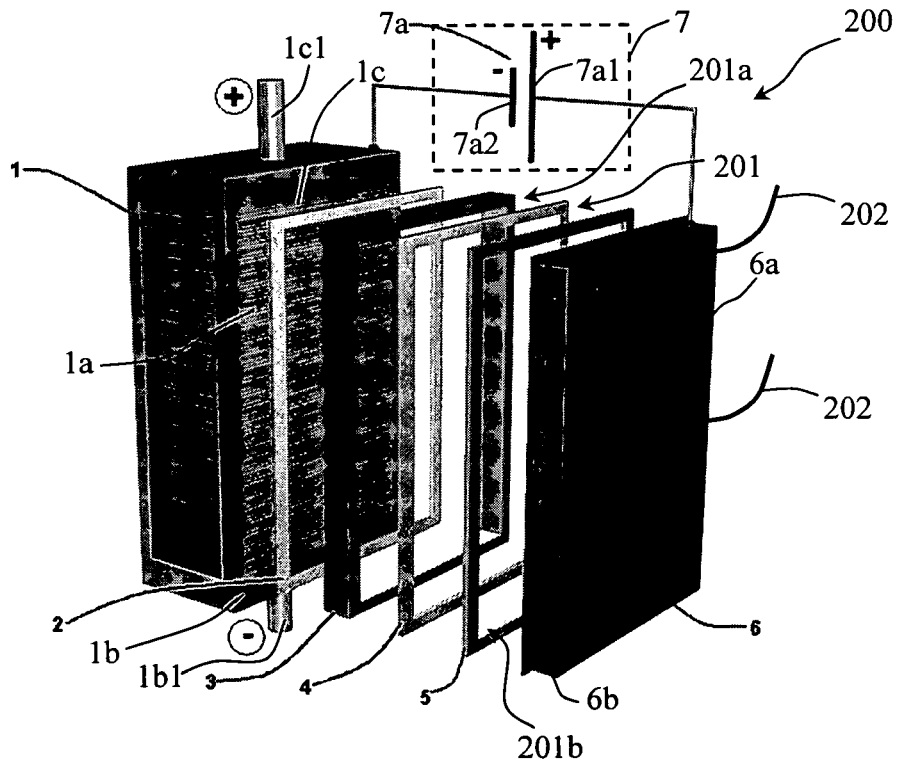
FIG. 2 shows an exploded view of an externally manifolded fuel cell system in accordance with the principles of the present invention.

FIG. 2 shows an exploded view of an externally manifolded fuel cell system 200 in accordance with the principles of the present invention. The fuel cell system 200 has a fuel cell stack 1 and a manifold 6 covering a face 1a of the stack 1. An electrical isolating assembly 201 is disposed between the fuel cell stack 1 and the manifold 6 for electrically isolating the manifold 6 from the stack. As shown, the assembly 201 has a similar construction as the electrical isolating assembly 101 of FIG. 1 and comprises a dielectric member 5, a wet gasket 2, which abuts the stack face 1a, followed by a ceramic block 3 and a dry gasket 4 disposed in an abutting relationship with one another. As shown, the members 2-5 are all formed to have picture-frame configurations.

The dielectric member 5 has high dielectric resistivity, i.e. greater than $10^8$ ohm-cm at 600° C. Mica sheet materials such as 503P phlogopite mica manufactured by Cogebi, Inc. may be used to form the dielectric member 5.

As discussed above, the fuel cell stack 1 has a large electrical potential gradient along its length. As shown, the negative potential end 1b of the stack 1 having the negative terminal 1b1 is at a negative-most electrical potential, while the positive potential end 1c of the stack having the positive terminal 1c1 is at a positive-most potential. The manifold 6 is at a constant electrical potential which is between the positive-most and the negative-most electrical potentials of the stack 1. In particular, the manifold 6 is at a lower electrical potential than the electrical potential at the positive potential end 1c of the stack. As discussed above, this causes electrolyte to flow from the end 1c of the stack to the manifold through the electrical isolation assembly 101.

In accord with the invention, the fuel cell system 200 is provided with a unit 7 for adjusting the electrical potential of the manifold 6 so as to impede electrolyte flow from the stack to the manifold. In particular, the unit 7 adjusts the electrical potential of the manifold 6 so that it approaches the electrical potential of the positive end 1c of the stack. Preferably, this adjustment is such that the electrical potential at the manifold 6 becomes equal to or greater than the electrical potential at the stack end 1c.

In the illustrative embodiment shown in FIG. 2, the unit 7 is in the form of a power supply 7a connected between the stack end 1c and the manifold 6. Specifically, the power supply can be a battery having its positive terminal 7a1 connected to the manifold 6 and its negative terminal 7a2 connected to the positive end 1c of the stack 1. Batteries, such as 12 volt car battery, are suitable for use as the power supply 7a.

With this connection, the power supply 7a applies a positive electrical potential to the manifold 6 to increase the manifolds' electrical potential so that it approaches that at the positive end 1c of the stack. Preferably, as above-mentioned, the battery potential is such that it is equal to or exceeds the potential at the stack end 1c.

In this way, the electrical potential gradient between the stack 1 and the manifold 6 is at least decreased and in the preferred form of the battery 7, is zeroed or is reversed. As a result, the carbonate ions at the stack face 1a are less attracted to the manifold 6 and, therefore, the driving of the electrolyte across the isolating assembly 201 is at least reduced, if not stopped or reversed. This helps the ceramic block 3, the dry gasket 4 and the dielectric member 5 to remain free of electrolyte, thereby aiding the electrical isolating assembly 201 to maintain its electrical isolation properties.

Figure 3:
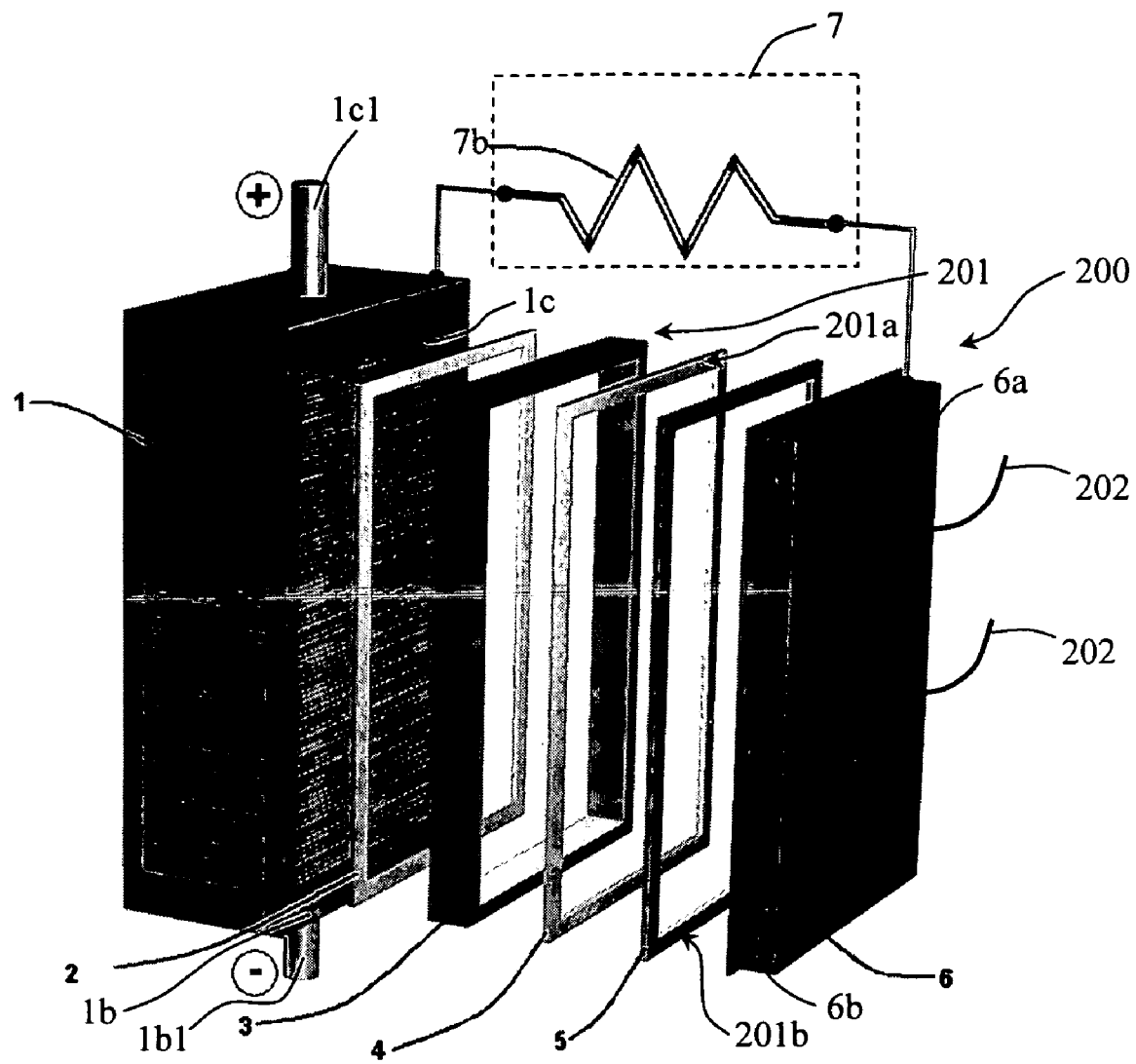
FIG. 3 shows an alternative embodiment of the fuel cell system of FIG. 2.

FIG. 3 shows an alternative embodiment of the fuel cell system 200 of FIG. 2 in accord with the present invention. In particular, in FIG. 2, the unit 7 is in the form of an electrical conductor 7b which connects the positive end 1c of the fuel cell stack 1 to the manifold 6. The conductor 7b typically might be an electrical wire sized according to the National Electrical Code. A typical wire might be a 1/16 inch SS316 welding rod. The electrical conductor might also contain a resistor and a fuse sized according to the National Electric Code based on a power rating of the fuel cell.

The presence of the electrical conductor 7b acts similarly to the battery in FIG. 2, causing the potential at the manifold to become closer to that at the positive potential end 1c of the stack. This, in turn, acts to reduce or retard electrolyte flow from the stack through the electrical isolating assembly 201, thereby tending to preserve its electrical isolating characteristics. Accordingly, electrical isolation can be better maintained between the manifold 6 and the stack 1 over the operating life of the stack.

It should be noted that only the manifold 6 and isolating assembly 201 adjacent one face 1*a* of the stack 1 has been illustrated in FIGS. 2 and 3. However, the system 200 usually will have like manifolds 6 and associated isolating assemblies 201 adjacent one or more of the other faces of the stack. In some applications, these manifolds will be connected electrically so as to be at the same potential. Thus, for example, a common stack manifold clamping system or a wire or wires 202, such as a ¹⁄₁₆ inch SS316 welding rod, may be used so as to provide the electrical connection. In such cases, the unit 7 between one of the manifolds and the its associated stack face will be sufficient to provide all manifolds with a potential closer to that of the positive end 1*c* of the stack.

In applications where the manifolds of a stack are not electrically connected, however, a unit 7 can be provided between each face of the stack at the positive potential end of the stack and the facing manifold.

In a further aspect of the invention, the fuel cell system 200 shown in FIGS. 2 and 3 may be further modified to provide a barrier to prevent debris from compromising the electrical or dielectric isolation between the manifold 6 and the stack 1. As can be appreciated, debris comprising conductive materials is typically formed in the system 200 due to the presence of corrosive materials at high temperatures. This debris accumulates on the upper outer surface 201*a* of the electrical isolation assembly 201 and the upper surface at the upper end 6*a* of the manifold 6 and also on the upper inner surface 201*b* of the assembly 201 and the upper surface at the lower end 6*b* of the manifold 6. Accumulation of such conductive debris may compromise electrical isolation between the stack 1 and the manifold 6 if the debris forms a bridge between the manifold 6 and the electrical isolation assembly components which are adjacent the stack, i.e., the ceramic block 3 and/or the wet gasket 2.

Figure 4A:
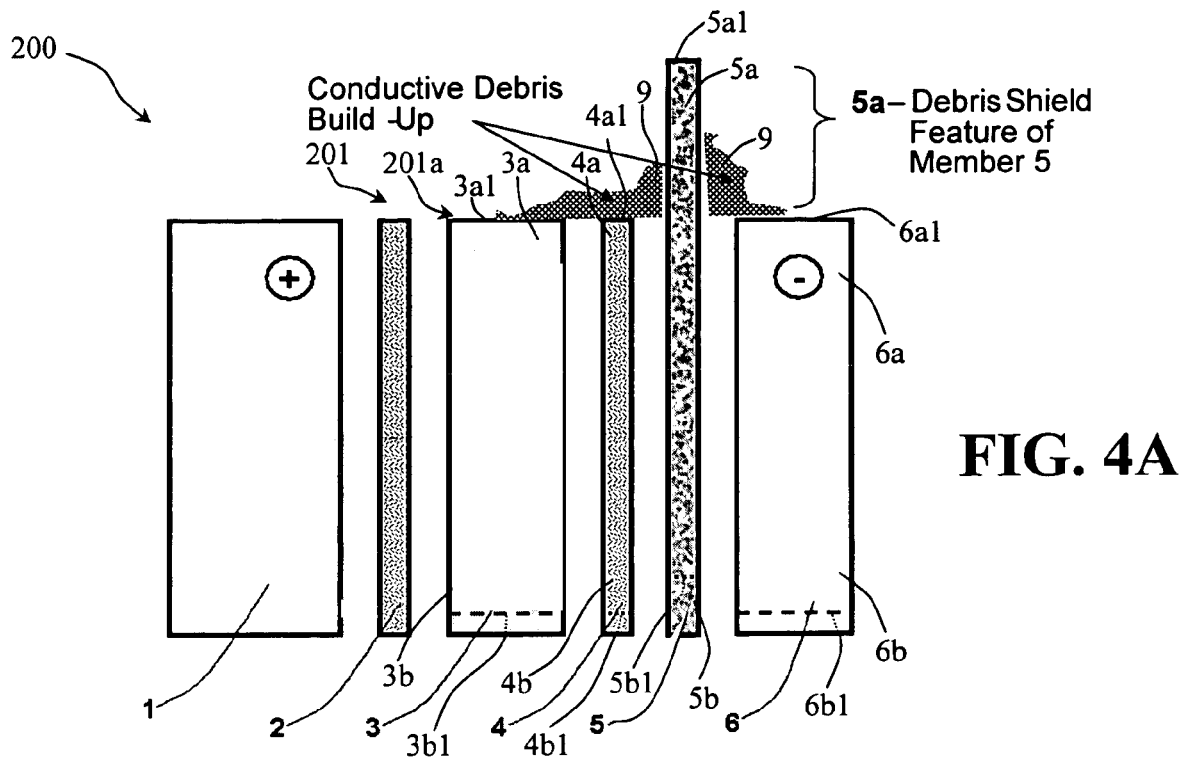
FIG. 4A shows an exploded side view of a modified arrangement of the fuel cell systems 200 of FIGS. 2 and 3 in accord with the present invention.

FIG. 4A shows an exploded side view of a modified arrangement of the fuel cell system 200 of FIGS. 2 and 3 adapted to inhibit the bridging of this debris. In this arrangement, the electrical isolating assembly 201 shown in FIGS. 2 and 3 has been modified to provide a dielectric member 5 whose upper end 5*a* has an outer surface 5*a*1 which extends beyond the upper outer surfaces 3*a*1, 4*a*1 and 6*a*1 of the upper outer ends 3*a*, 4*a* and 6*a* of the ceramic block 3, dry gasket 4 and manifold 6, respectively. Additionally, the upper inner surface 5*b*1 of the lower end 5*b* of the dielectric member 5 extends above the upper inner surfaces 3*b*1, 4*b*1, 6*b*1 of the lower ends 3*b*, 4*b* and 6*b* of the gasket 3, ceramic block 4 and manifold 6.

As a result, dielectric member 5, forms a physical barrier separating the surfaces 3*a*1 and 4*a*1 from the surface 6*a*1 and the surfaces 3*b*1 and 4*b*1 from the surface 6*b*1. The debris on the ceramic block 3 and dry gasket 4 is thus prevented from bridging with the debris on the manifold 6. The electrical coupling or connection of these elements and, thus, the manifold and stack by the debris 9 is thus avoided.

Figure 4B:
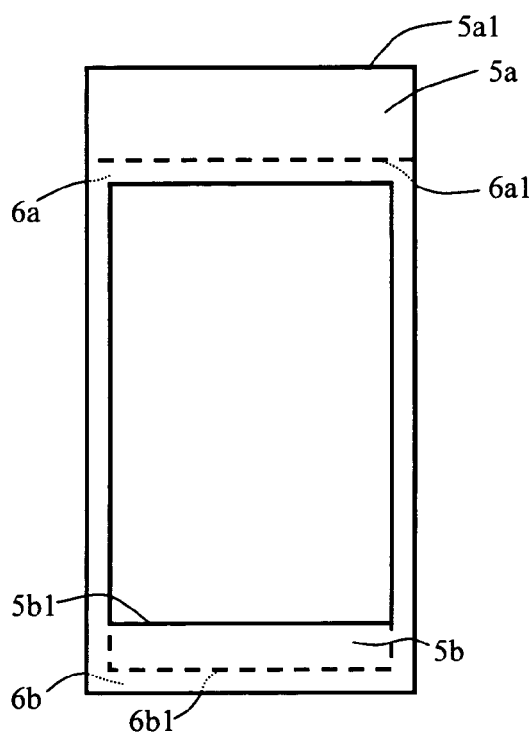
FIG. 4B shows a front view of a dielectric member of FIG. 4A.

FIG. 4B shows a front view of the dielectric member 5 of FIG. 4A viewed from the face of the dielectric member 5 abutting the dry gasket 4. The manifold 6, shown in dashed lines in FIG. 4B, abuts the opposed face of the dielectric member S. As can be seen, the upper surface 5*a*1 of the upper outer end 5*a* of the dielectric member 5 extends beyond the upper surface 6*a*1 of the upper outer end 6*a* of the manifold 6 so as to form a barrier, as discussed above. As also discussed above, this barrier prevents debris on the surfaces 3*a*1 and 4*a*1 from bridging with the debris on the surface 6*a*1.

Likewise, the upper surface 5*b*1 of the lower end 5*b* of the dielectric member 5 extends beyond upper surface 6*b*1 of the lower end 6*b* of the manifold 6 so as to form another barrier. This barrier similarly prevents debris on the surfaces 3*b* 1, 4*b*1 from bridging with the debris on the surface 6*b*1.

These barriers therefore prevent debris accumulating on the ceramic member 3 and dry gasket 4 from connecting with debris on the manifold 6. In this way, electrical isolation between the manifold 6 and the stack 1 is improved, thus extending the life and performance of the system.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

What is claimed is:

1. A fuel cell system comprising:
   a fuel cell stack having a positive potential end and a negative potential end;
   a manifold for use in coupling gases to or from a face of said fuel cell stack,
   an electrical isolating assembly situated between said manifold and said stack for electrically isolating said manifold from said stack; and
   a unit for adjusting an electrical potential of said manifold such as to impede electrolyte movement from said stack across said electrical isolating assembly; and
   wherein said unit is connected between said positive potential end of said fuel cell stack and said manifold.

2. A fuel cell system in accordance with claim 1, wherein said unit adjusts the electrical potential of said manifold to be one of equal to and greater than the electrical potential at said positive potential end of said stack.

3. A fuel cell system in accordance with claim 1, wherein said unit comprises a power supply.

4. A fuel cell system in accordance with claim 3, wherein said power supply comprises a battery having a negative terminal connected to said positive potential end of said fuel cell stack and a positive terminal connected to said manifold.

5. A fuel cell system in accordance with claim 4, wherein said battery provides an electrical potential between said positive terminal and said manifold which is one of equal to and greater than the electrical potential at said positive potential end of said stack.

6. A fuel cell system in accordance with claim 1, wherein said unit is an electrical conductor.

7. A fuel cell system in accordance with claim 6, wherein said electrical conductor is a wire.

8. A fuel cell system in accordance with claim 1, wherein said electrical isolating assembly comprises a dielectric member adjacent said manifold and one or more other members including one or more gaskets disposed in an abutting relationship between said stack and said dielectric member.

9. A fuel cell system in accordance with claim 8, wherein said dielectric member is a mica sheet.

10. A fuel cell system in accordance with claim 9, wherein said mica sheet comprises 503P phlogopite mica.

11. A fuel cell system in accordance with claim 8, wherein said one or more other members include a wet gasket abutting said face of said stack, a ceramic member abutting said wet gasket and a dry gasket disposed between said ceramic member and said dielectric member in an abutting relationship.

12. A fuel cell system in accordance with claim 11, wherein said wet gasket, said ceramic member, said dry gasket and said dielectric member each has a picture frame configuration.

13. A fuel cell system in accordance with claim 12, wherein the upper surface at the upper end of said dielectric member extends beyond the upper surface at the upper end of each of one or more of said manifold, said ceramic member and said dry gasket.

14. A fuel cell system in accordance with claim 13, wherein the upper surface at the lower end of said dielectric member extends beyond the upper surface at the lower end of each of one or more of said manifold, said ceramic member and said dry gasket.

15. A fuel cell system in accordance with claim 14, wherein said unit comprises a battery having a negative terminal connected to said positive potential end of said fuel cell stack and a positive terminal connected to said manifold.

16. A fuel cell system in accordance with claim 14, wherein said unit comprises an electrical wire connected between said positive potential end of said fuel cell stack and said manifold.

17. A fuel cell system in accordance with claim 8, wherein;
said dielectric member is of a configuration to inhibit debris collecting on a surface of one or more of said one or more members from bridging with the debris collecting on a surface of said manifold.

18. A fuel cell system in accordance with claim 17, wherein said surface of said one or more of said one or more members is a surface facing upward and said surface of said manifold is a surface facing upward.

19. A fuel cell system in accordance with claim 1, further comprising:
one or more further manifolds each situated adjacent a different one of one or more further faces of said stack;
and an electrical assembly connecting said manifold and said further manifolds so that said manifold and further manifolds are at substantially the same electrical potential.

20. A fuel cell system in accordance with claim 2, further comprising:
one or more further manifolds each situated adjacent a different one of one or more further faces of said stack;
one or more further electrical isolating assemblies each situated between a different further manifold and the further face of said stack adjacent that further manifold for electrically isolating that further manifold from said stack; and
one or more further units each for adjusting the electrical potential of a different further manifold such as to impede electrolyte movement from said stack through the further electrical isolating assembly adjacent that further manifold.

21. A method of impeding the flow of electrolyte from a fuel cell stack through an electrical isolating assembly situated between a face of said fuel cell stack and a manifold for electrically isolating said stack from said manifold, said method comprising connecting a unit in between a positive potential end of said fuel cell stack and said manifold, said unit adjusting an electrical potential of said manifold such as to impede the electrolyte flow from said stack.

22. A method in accordance with claim 21, wherein said electrical potential of said manifold is adjusted to be one of equal to and greater than the electrical potential at said positive potential end of said stack.

23. A method in accordance with claim 21, wherein said electrical potential of said manifold is adjusted by connecting one of a battery and an electrical conductor between said manifold and the positive potential end of said fuel cell stack.

24. A method in accordance with claim 23, wherein said electrical conductor is a wire.

25. A method in accordance with claim 21, wherein said isolating assembly comprises a dielectric member adjacent said manifold and one or more other members disposed in an abutting relationship between said stack and said dielectric member, and said method further comprises:
inhibiting debris collecting on a surface of one or more of said one or more other members from bridging with the debris collecting on a surface of said manifold.

26. A method in accordance with claim 25, wherein said one or more other members include a wet gasket abutting said face of said stack, a ceramic member abutting said wet gasket and a dry gasket disposed between said ceramic member and said dielectric member in an abutting relationship, and wherein:
said inhibiting comprises configuring said dielectric member such that the upper surface at the upper end of said dielectric member extends beyond the upper surface at the upper end of each of one or more of said manifold, said ceramic member and said dry gasket.

27. A method in accordance with claim 26, wherein said configuring is further such that the upper surface at the lower end of said dielectric member extends beyond the upper surface at the lower end of each of one or more of said manifold, said ceramic member and said dry gasket.

28. A fuel cell system comprising:
a fuel cell stack;
a manifold for use in coupling gases to and from a face of said fuel cell stack; and
an electrical isolating assembly including a dielectric member adjacent to and in contact with said manifold and one or more other members situated in an abutting relationship between said dielectric member and said stack for electrically isolating said manifold from said stack; and
wherein said dielectric member is configured to inhibit debris collecting on a surface of one or more of said one or more members from bridging with the debris collecting on a surface of said manifold.

29. A fuel cell system in accordance with claim 28, wherein: said surface of said one or more of said one or more other members is a surface facing upward and said surface of said manifold is a surface facing upward.

30. A fuel cell system in accordance with claim 28, wherein said one or more other members include a wet gasket abutting said face of said stack, a ceramic member abutting said wet gasket and a dry gasket disposed between said ceramic member and said dielectric member in an abutting relationship, and wherein:
said dielectric member is configured such that the upper surface at the upper end of said dielectric member extends beyond the upper surface at the upper end of each of one or more of said manifold, said ceramic member and said dry gasket.

31. A fuel cell system in accordance with claim 30, wherein said dielectric member is further configured such that the upper surface at the lower end of said dielectric member extends beyond the upper surface at the lower end of each of one or more of said manifold, said ceramic member and said dry gasket.

32. A fuel cell system in accordance with claim 31, wherein said wet gasket, said ceramic member, said dry gasket and said dielectric member each has a picture frame configuration.

33. A dielectric member for use in an isolating assembly with one or more other members, the isolating assembly to be used to isolate a manifold from the face of a fuel cell stack, the dielectric member being configured such that when used in said isolating assembly said dielectric member is adjacent to and in contact with said manifold and said one or more other members are in abutting relationship between said dielectric member and said stack, said dielectric member being configured to inhibit debris collecting on a surface of one or more of said one or more other members from bridging with the debris collecting on a surface of said manifold.

34. A dielectric member in accordance with claim 33, wherein said one or more other members include a wet gasket abutting said face of said stack, a ceramic member abutting said wet gasket and a dry gasket disposed between said ceramic member and said dielectric member in an abutting relationship, and wherein:

said dielectric member is configured such that the upper surface at the upper end of said dielectric member extends beyond the upper surface at the upper end of each of one or more of said manifold, said ceramic member and said dry gasket.

35. A dielectric member in accordance with claim 34, wherein: said dielectric member is further configured such that the upper surface at the lower end of said dielectric member extends beyond the upper surface at the lower end of each of one or more of said manifold, said ceramic member and said dry gasket.

36. A dielectric member in accordance with claim 35, wherein said wet gasket, said ceramic member, said dry gasket each have a picture frame configuration and wherein:

said dielectric member has a picture frame configuration.

* * * * *

UNITED STATES PATENT AND TRADEMARK OFFICE
CERTIFICATE OF CORRECTION

PATENT NO. : 7,276,304 B2 Page 1 of 1
APPLICATION NO. : 11/020593
DATED : October 2, 2007
INVENTOR(S) : Dana A. Kelley et al.

It is certified that error appears in the above-identified patent and that said Letters Patent is hereby corrected as shown below:

Column 5, line 66, delete "member S" and insert --member 5--

Column 7, line 45, delete "claim 2" and insert --claim 1--

Signed and Sealed this

Twelfth Day of August, 2008

JON W. DUDAS
*Director of the United States Patent and Trademark Office*